(12) United States Patent
Pentovski et al.

(10) Patent No.: US 6,185,671 B1
(45) Date of Patent: *Feb. 6, 2001

(54) CHECKING DATA TYPE OF OPERANDS SPECIFIED BY AN INSTRUCTION USING ATTRIBUTES IN A TAGGED ARRAY ARCHITECTURE

(75) Inventors: Vladimir Pentovski; Gerald Bennett, both of Folsom; Stephen A. Fischer, Shingle Springs; Eric Heit, Folsom, all of CA (US); Glenn J. Hinton; Patrice L. Roussel, both of Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/053,358

(22) Filed: Mar. 31, 1998

(51) Int. Cl.[7] .................................................. G06F 9/30
(52) U.S. Cl. .......................... 712/216; 712/23; 712/210
(58) Field of Search ............................ 712/11, 71, 1–43, 712/200–248, 300

(56) References Cited

U.S. PATENT DOCUMENTS

| | | | |
|---|---|---|---|
| 5,519,841 | * | 5/1996 | Sager .................................... 711/202 |
| 5,740,441 | * | 4/1998 | Yellin .................................... 395/705 |
| 5,765,016 | * | 6/1998 | Walker .................................... 712/23 |
| 5,790,826 | * | 8/1998 | Thusoo .................................. 712/216 |
| 5,884,071 | * | 3/1999 | Kosaraju ............................... 712/245 |
| 5,889,982 | * | 3/1999 | Rodgers ................................ 712/229 |
| 5,978,901 | * | 11/1999 | Luedtke et al. ...................... 712/222 |
| 6,009,511 | * | 12/1999 | Lynch et al. ......................... 712/222 |

OTHER PUBLICATIONS

Visual Instruction Set (VIS) User's Guide, Sun Microsystems, Version 1.1, Mar. 1997, pp i–xii, 1–127.
AMD–3D Technology Manual, Advance Micro Devices, (AMD), Feb. 1998, pp i–x, 1–58.
Microsoft, Microsoft Press Computer Dictionary, 3rd, Ed., 1997, pp. 254,342,480.*
Rosenberg, Jerry, Dictionary of Computers, Information Processing & and Telecommunications, 1987, p. 672.*

* cited by examiner

*Primary Examiner*—Meng-Ai T. An
*Assistant Examiner*—Stacy Whitmore
(74) *Attorney, Agent, or Firm*—Blakely, Sokoloff, Taylor & Zafman LLP

(57) ABSTRACT

The present invention discloses a method and apparatus for matching data types of operands in an instruction. A type code of an operand used by the instruction is determined. An attribute value of a storage element which corresponds to the operand is read from a speculative array. This attribute value is then compared with the type code.

30 Claims, 7 Drawing Sheets

CHECKING DATA TYPE OF OPERANDS SPECIFIED BY AN INSTRUCTION USING ATTRIBUTES IN A TAGGED ARRAY ARCHITECTURE

BACKGROUND OF THE INVENTION

1. Field of the Invention

This invention relates to microprocessor systems. In particular, the invention relates to data type checking using a tagged array architecture.

2. Description of Related Art

Specific implementations of high performance microprocessors tend to exploit the particular design aspects in order to achieve high performance or other design objectives. These implementations usually involve different internal data representations. The incompatibility of the internal data representations between different implementations causes many problems including incorrect and/or unexpected results.

One of the basic internal representations is the data type of the operands in an operation or instruction. Typical operations or instructions involve two source operands and a destination operand. To maintain consistency of the representation, the types of data at four localities have to match. These localities include the operation itself, the two source operands, and the destination operand. In addition to the data type, the size of the operand is also important. For example, a double-precision floating-point operation expects the two source operands and the destination operand to be represented in a 64-bit floating-point number format. A type or size mismatch is an indication of some kind of error, such as incorrect parameters, programming mistake, etc.

Type checking of data can be enforced through a number of methods. One method is to associate a specific set of registers of predetermined type and size for a predetermined set of instructions. For example, floating-point instructions can only access floating-point registers. The disadvantages of this method include the use of large silicon area for implementing the pre-assigned registers. Another method is the use of compilers to check for data types. The compiler method, however, involves a high overhead for testing data values and results in lower performance. In addition, not all compilers are compatible; therefore, a program that works under one operating system may not work under another operating system.

In pipelined and superscalar microprocessors, the problem of type mismatch is even more difficult. In particular, the prefetching of instructions and out-of-order execution render data type tracking difficult. Other problems associated with instruction decoding and execution also create architectural challenges. Some examples of these problems are aliased register sets, instruction retirement, mispredicted branches, and exception processing.

Therefore there is a need in the technology to provide an efficient method to facilitate data type matching.

SUMMARY OF THE INVENTION

The present invention discloses a method and apparatus for matching data types of operands in an instruction. A type code of an operand used by the instruction is determined. An attribute value of a storage element which corresponds to the operand is read from a speculative array. This attribute value is then compared with the type code.

BRIEF DESCRIPTION OF THE DRAWINGS

The features and advantages of the invention will become apparent from the following detailed description of the invention in which.

DESCRIPTION OF THE PRESENT INVENTION

A method and apparatus for checking data types in microprocessor operations is disclosed. The method uses a tagged architecture that associates a set of registers with a set of tag values stored in two tag arrays: a speculative array and a retirement array. When a micro-operation is issued, the corresponding tag values of the sources are read from the speculative array. These values are matched against the values decoded from the micro-operation and the destination values. If these tag values do not match, a fault condition occurs. When a micro-operation is retired, the retirement array is updated. When there is an exception condition, the retirement array is transferred to the speculative array to maintain the data type. The method provides a fast and efficient mechanism to check data types.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
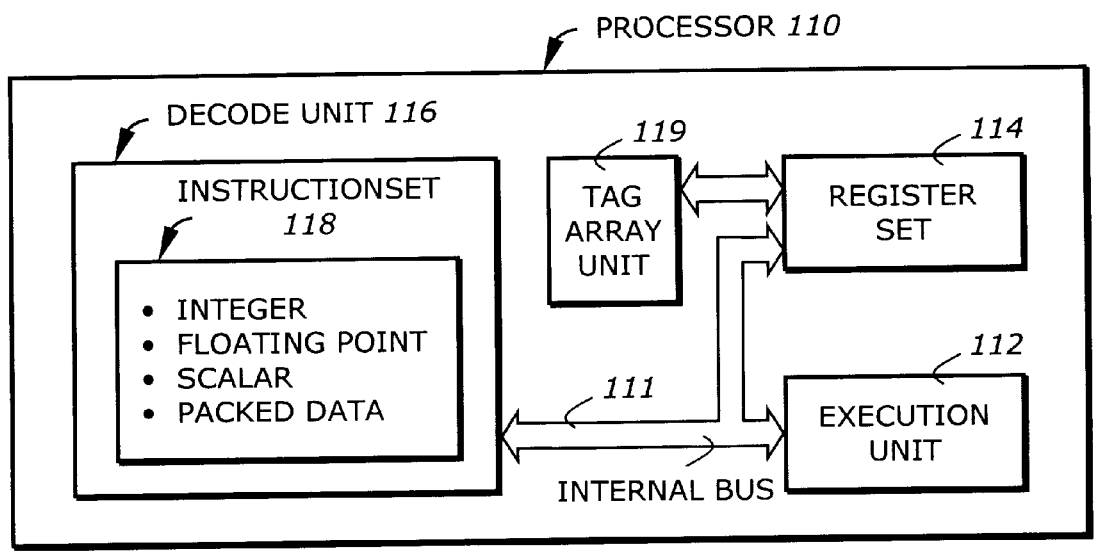
FIG. 1 is a diagram illustrating one embodiment of a computer system 100 in accordance with the teachings of the invention.

FIG. 1 is a diagram illustrating one embodiment of a processor 110 in accordance with the teachings of the present invention.

The processor 110 represents a central processing unit of any type of architecture, such as complex instruction set computers (CISC), reduced instruction set computers (RISC), very long instruction word (VLIW), or hybrid architecture.

FIG. 1 illustrates that the processor 110 includes a decode unit 116, a set of registers 114, a tag array unit 119, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.).

The decode unit 116 is shown including packed data instruction set 118 for performing operations on packed data. The number format for these operations can be any convenient format, including single-precision, double-precision, and extended floating-point numbers, signed and unsigned integers, and non-numeric data. In one embodiment, the arithmetic operations performed responsive to at least some of the packed data instructions use a single-precision 32 bit floating-point number format However, the arithmetic instructions may be applied to integer data as well. Furthermore, in one embodiment, the processor 110 is a superscalar pipelined processor (e.g., similar to the Pentium® pro processor manufactured by Intel Corporation of Santa Clara, Calif.). In addition to the packed data instructions, the processor 110 can include new instructions and/or instructions similar to or the same as those found in existing general purpose processors. For example, in one embodiment the processor 110 supports an instruction set which is compatible with the Intel Architecture instruction set used by existing processors, such as the Pentium® processor. Alternative embodiments of the invention may contain more or less, as well as different, packed data instructions and still utilize the teachings of the invention.

The register set 114 represents a storage area on processor 110 for storing information, e.g., control/status information, packed and/or scalar integer data, packed and/or scalar floating-point data, etc. The tag array unit 119 is coupled to the register set 114 to provide the tag values which are used for matching data types in accordance to the teachings of the present invention. The tag array unit 119 will be described in more detail later.

THEORY OF THE TAGGED ARRAY ARCHITECTURE

A microarchitecture may have different implementations. Each implementation may correspond to a different instruction set. For example, a regular packed data implementation treats an operand as a 64-bit data, while an extended packed data implementation treats an operand as a 128-bit data. Software written for one implementation may not work in another implementation.

In microprocessors, most instructions involve the use of a set of registers. A decoded instruction may correspond to a number of micro-operations (or uOps). Each instruction typically specifies two source operands and one destination operand. These operands may come from memory or registers. However, at the micro level, most, if not all, operands are stored in registers (in dedicated registers and/or dynamically allocated registers using a register renaming technique). In one embodiment, an instruction specifies two registers, one of which is designated as a source and the destination. The registers specified by the instructions are referred to as architectural registers. Different implementations use the architectural registers in different ways (e.g., dedicated registers, dynamically allocated registers using register renaming, etc.). Thus, the invention is not limited to how the architectural registers are implemented.

During the decoding process, the source and destination architectural registers are identified. In addition, the type of data involved in the associated uOps is also recognized. Enforcing the strong-type consistency involves matching the attributes of the uOps to those of the operands. In other words, the attributes as expected by the uOp should be the same with the attributes associated with the source and destination architectural registers.

To implement the strong-type policy, the attributes of each architectural register in the set of architectural registers should be kept track of. In one embodiment, this is accomplished by maintaining an array that stores the attributes for the set of architectural registers. When a uOp is issued from the instruction decoder, the information about the uOp and the source and destination architectural registers is extracted to look up the attributes stored in the array. Matching of the attributes can then be performed by comparing the expected attributes and the current attributes of the specified source and destination architectural registers. This array is constantly updated as the uOps are issued. Therefore, the attributes of the architectural registers are kept track of. This array is referred to as the speculative array.

There are, however, two problems that need to be resolved for the implementation of the attribute tracking mechanism. The first problem is the incorrect updating of the attributes in the speculative array due to branch misprediction. The second problem is the concurrent dependency.

In pipelined and superscalar architectures, the instructions are continuously fetched and executed based on some pre-defined program order. A commonly known problem in pipelined architecture is the branch prediction. This problem arises because the a branch instruction may alter the normal program flow which interferes with the sequential fetching and decoding of the instructions. The problem is partially resolved by applying a branch prediction algorithm to guess the next instruction to be fetched. However, the prediction may still be incorrect. When this occurs, the instructions that were fetched and decoded in the pipeline based on the incorrect prediction are wrong and the attributes of the associated architectural registers during the updating of the speculative array are no longer valid. In this case, it is necessary to return back to the previous condition before the misprediction. A mechanism that facilitates this restoration is the retirement mechanism.

An instruction is retired when it is determined that it is no longer needed in the instruction buffer. Usually, an instruction is retired when its execution is guaranteed. Retirement of an instruction can occur after, at the same time, or even before the execution of the instruction. Regardless of when an instruction is retired, the attributes at the time it is retired are the valid attributes. Therefore, if these attributes are stored and updated only when an instruction is retired, they can be used to restore the previous and correct condition (e.g., prior to when a branch was mispredicted). This is implemented by storing these retiring attributes in another array, referred to as a retired array.

The retired array essentially stores the same attributes as in the speculative array, with some lag time. In other words, the speculative array contains the latest and most current attributes of the architectural registers, but these attribute values may be incorrect (e.g., due to a mispredicted branch). The retired array is updated with the attributes of an instruction when it is retired. When there is an error requiring the processor to be backed up to a previous state, the contents of the retired array are transferred to the speculative array to restore the attributes to the condition prior to the exception condition.

The concurrent dependency problem may cause an incorrect matching. This problem arises when there is dependency in the concurrently issued uOps within the same macro clock cycle. In one embodiment, up to three uOps may be issued in a macro clock cycle. An architectural register may be used by more than one uOp. For example, an architectural register may be a destination of a first uOp and a source architectural register of the second uOp. In this case, the attributes of the architectural register are updated when the first uOp is issued. These updated attributes may then be incorrectly read by the second (or third) uOp. Other dependency problems may arise which cause incorrect matching of the attributes.

To resolve this problem, an overriding mechanism is implemented. This overriding mechanism essentially keeps a copy of the attributes of a architectural register. This copy will be re-used by a subsequent uOp when there is a dependency condition, even if the attributes are updated in the speculative array by an earlier uOp. A circuit to analyze the dependency across the uOps generates a select signal to select this copy for use by a uOp if it determines that a dependency exists between this uOp and an earlier uOp.

IMPLEMENTATION OF THE TAGGED ARRAY ARCHITECTURE

In one embodiment of an out-of-order processor that uses a register renaming and a re-order buffer, the tagged array architecture is implemented in the register allocation table (RAT). While one embodiment is described in which an out-of-order processor with a specific internal architecture is described, alternative embodiments can be in-order processors and/or use a different internal architecture (e.g., a different register renaming mechanism, a different instruction ordering mechanism than a re-order buffer, etc.) The attribute of a architectural register includes a tag field and a size field.

Tag Field Functionality

For each architectural register, there is a tag field indicating the tag value associated with the operand in the architectural register. In one embodiment, the tag field is 3-bit to encode up to 8 types of data. The encoding of the tag field accommodates a number of data types, including character, integer, floating-point (single precision and double precision).

Size Bit Functionality

For each architectural register, there is a size field indicating the size of the operand. If there is a size mismatch between either of the two sources and the destination, then a data tag fault is detected.

For simplicity, in the following description, tag field and tag values are used to describe the attribute. The size field and size values can be used together with the tag field and tag values. Furthermore, any other attributes can also be included.

Figure 2:
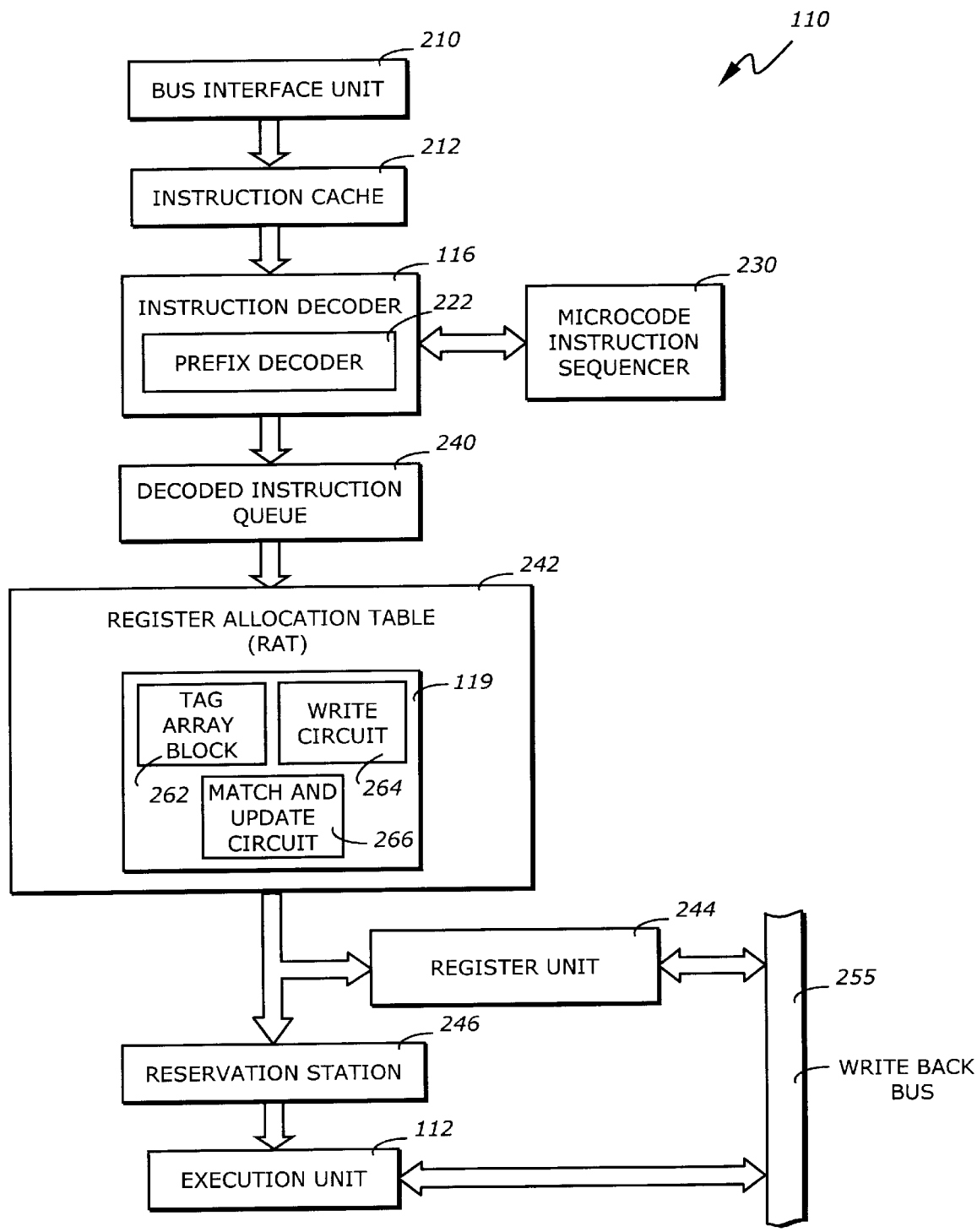
FIG. 2 is a diagram illustrating one embodiment of a processor 110 according to one embodiment of the invention.

FIG. 2 is a diagram illustrating a processor 110 according to one embodiment of the invention. For clarity, only a portion of the processor 110 which is useful in describing the invention is shown in FIG. 2. The processor 110 includes a bus interface unit 210, an instruction cache 212, the instruction decoder 116, a microcode instruction sequencer 230, a decoded instruction queue 240, a register allocation table (RAT) 242, the tag array unit 119, the architectural register set 114, a register unit 244, a reservation station 246, an execution unit 250, and a write-back bus 255.

The bus interface unit 210 fetched the instruction opcode from the external program memory. The program memory corresponds to the program/code 136 (FIG. 1). The fetched opcodes are stored in the instruction code cache 212. The instruction decoder 116 reads the opcodes from the instruction cache 212 and decodes the instruction. A number of decoders may be used to decode the instruction opcode.

The microcode instruction sequencer 230 generates the address for the microprogrammed routine that corresponds to the decoded instruction. The micro-instructions are stored in a microprogrammed memory (not shown). The decoded instruction is stored in the decoded instruction queue 240.

The decoded instruction includes a number of micro-operations (or uOps). The uOps are issued from the instruction decoder 116 and go to the tag array unit 119 and the architectural register allocation table (RAT) 242.

The tag array unit 119 includes a tag array block 262, a write circuit 264, and a match and update circuit 266. The tag array block 262 includes the two arrays that are used to store the tag values. The write circuit 264 writes the tag values to the two arrays. The match and update circuit 266 performs the matching of the data types associated with the uOp.

The register allocation table 242 determines the source of the register operands for the uops. The register unit 244 stores the uops. In one embodiment, the register unit 244 is referred to a re-order buffer (ROB). In one embodiment, the uops are stored in the register unit 244 in strict program order. The reservation station 246 copies multiple uOps from the register unit 244 and queues them up for delivery to the appropriate functional elements in the execution unit 112. The execution unit 112 includes functional elements needed to execute the instruction such as arithmetic logic unit, floating-point unit, etc. The results produced by the execution unit 112 are written back to the register unit 244 via the write-back bus 255.

The tagged architecture as implemented in the tag array unit 119 can operate in an out-of-order processor or an in-order processor. The tag array unit 119 is used to perform type checking to maintain compatibility of data type among different implementations.

Figure 3:
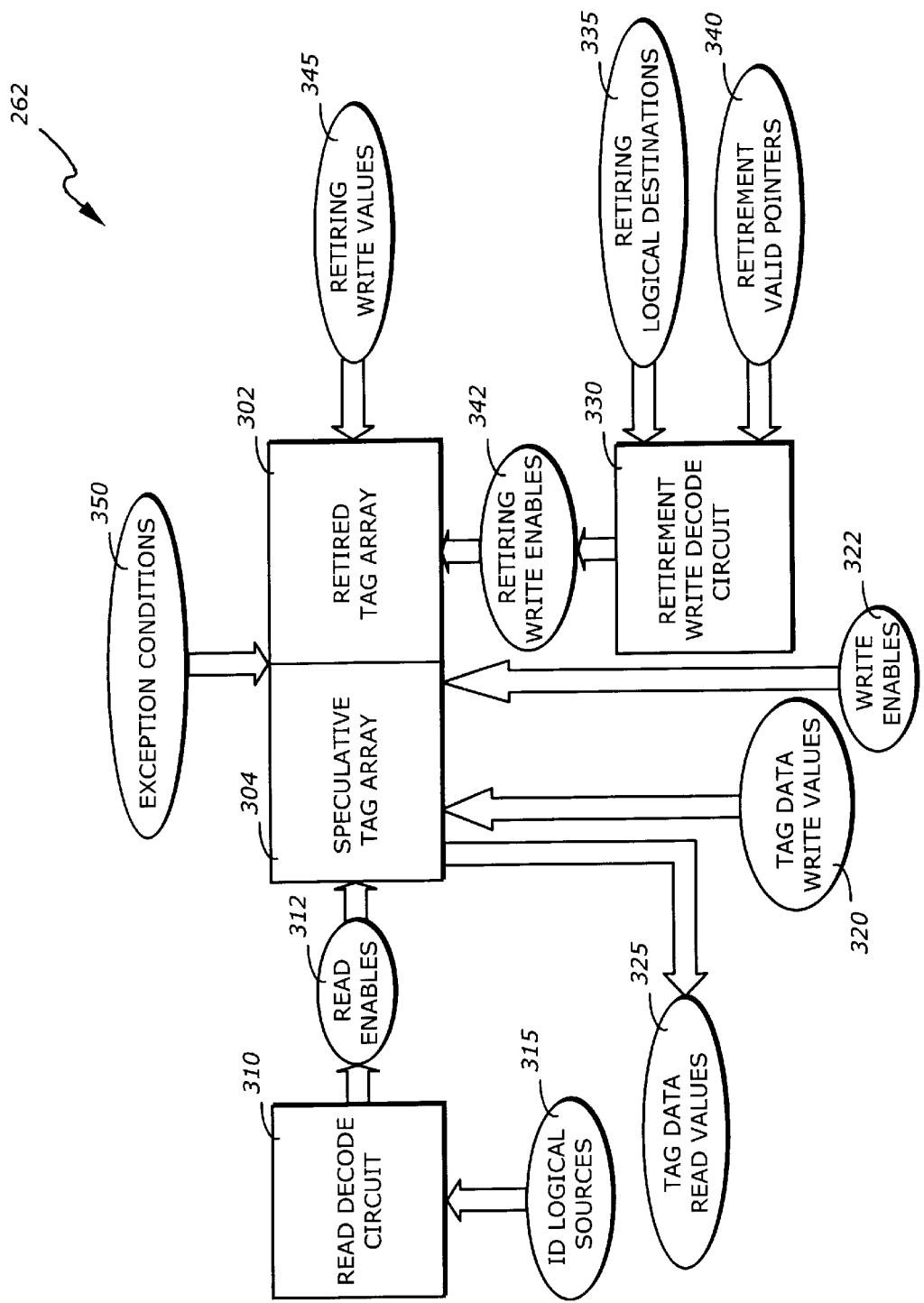
FIG. 3 is a diagram illustrating a tag array block according to one embodiment of the invention.

FIG. 3 is a diagram illustrating a tag array block 262. The array block 262 includes a retired array 302, a speculative array 304, a read decode circuit 310, a retirement write decode circuit 330, and data and signals 315, 320, 322, 325, 335, 340, and 350.

The read decode circuit 310 receives the instruction decoder (ID) logical sources 315 to generate the appropriate read enables 312. The speculative array 304 receives the read enables 312 from the read decode circuit 310 and the tag data write values 320 and the write enables 322. The read enables 312 are used during the uOp issuance. Upon receipt of the read enables 312, the speculative array 304 generates the tag data read values 325 for the uOps. The tag data write values 320 are written into the speculative array 304 for those check set (chkset) encodings which set the destination tag values.

The retirement write decode circuit 330 receives the retiring logical destination 335 and the retirement valid pointers 340 to generate the retiring write enables 342 for updating the retired array 302. The retired array 302 receives the retiring write enables 342 from the retirement write decode circuit 330 and the retiring write values 345. The retiring write values 345 represent the tag values of the retiring uOps. When a uOp is retired, its tag values are written into the retired array 302.

The speculative array 304 and the retired array 302 both receive the exception condition signals 350. The exception condition signals 350 represent a condition where there is an exception that alters the normal program flow, such as a mispredicted branch. Upon receiving the exception signal, the contents of the retired array 302 are transferred to the speculative array 304.

Figure 4:
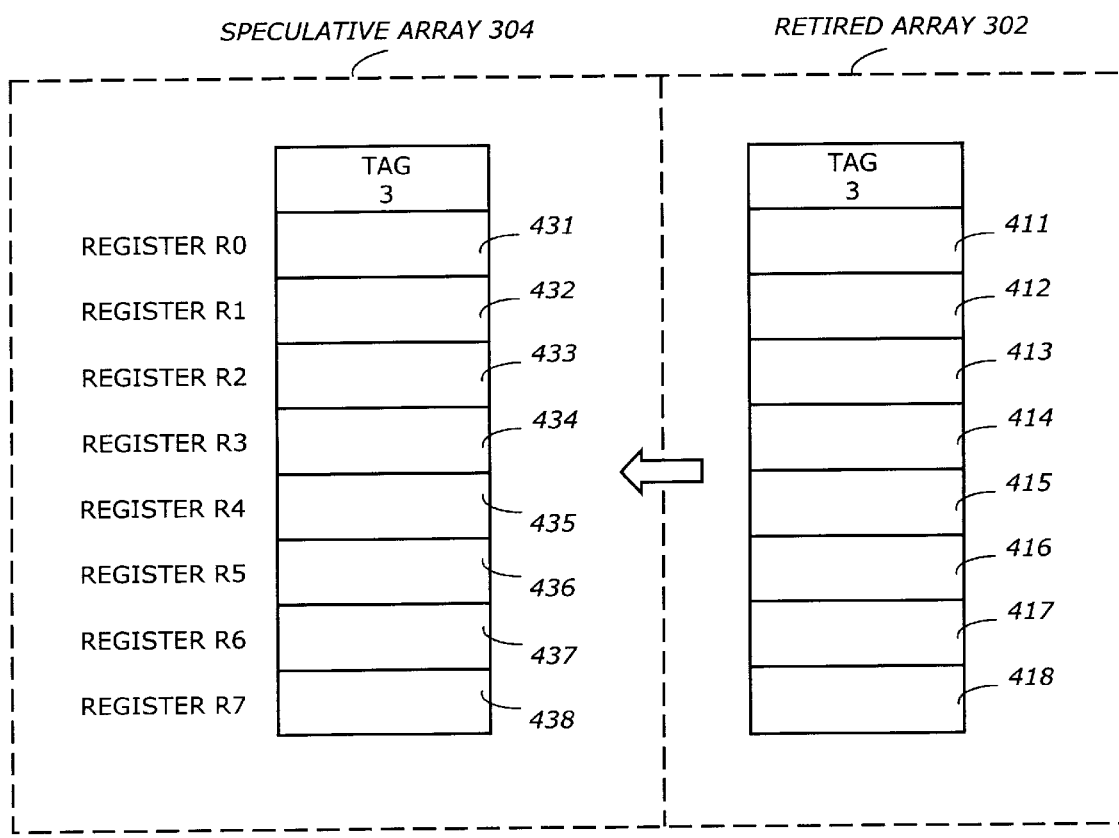
FIG. 4 is a diagram illustrating the organization of the retired array 302 and the speculative array 304 according to one embodiment of the invention.

FIG. 4 is a diagram illustrating the organization of the retired array 302 and the speculative array 304.

For every physical register mapped for a given architectural register as part of the current speculative state, there is an entry in the speculative array and the retired array. For example, if two 64-bit physical registers are used to provide a single 128-bit architectural register, two entries would be used.

In the illustrative example shown in FIG. 4, the retired array 302 includes eight tag fields 411, 412, 413, 414, 415, 416, 417, and 418, corresponding to the R0, R1, R2, R3, R4, R5, R6, and R7 architectural registers, respectively. The speculative array 304 is organized in a similar fashion as the retired array 302. The speculative array 304 includes eight tag fields 431, 432, 433, 434, 435, 436, 437, and 438, corresponding to the R0, R1, R2, R3, R4, R5, R6, and R7 architectural registers, respectively. When the retired array 302 is transferred to the speculative array 304, the contents of the tag fields of the registers are copied from the retired array 302 to the corresponding tag fields in the speculative array 304.

Variations of the organization of the two arrays is possible. For example, additional attribute fields can be included (e.g., size). The number of tag fields may also vary depending on the number of registers.

When a uOp is issued, its sources are used to look up the tag field of the corresponding architectural registers in the speculative array 304. When a uOp is retired, its corresponding tag field is written to the retirement array 302. The retirement array 302 therefore stores the updated values of the tag field at the time the uOps are retired. When there is an exception condition, the tag field in the speculative array is no longer valid; therefore, the contents of the retired array 302 are transferred to the speculative array 304.

Figure 5:
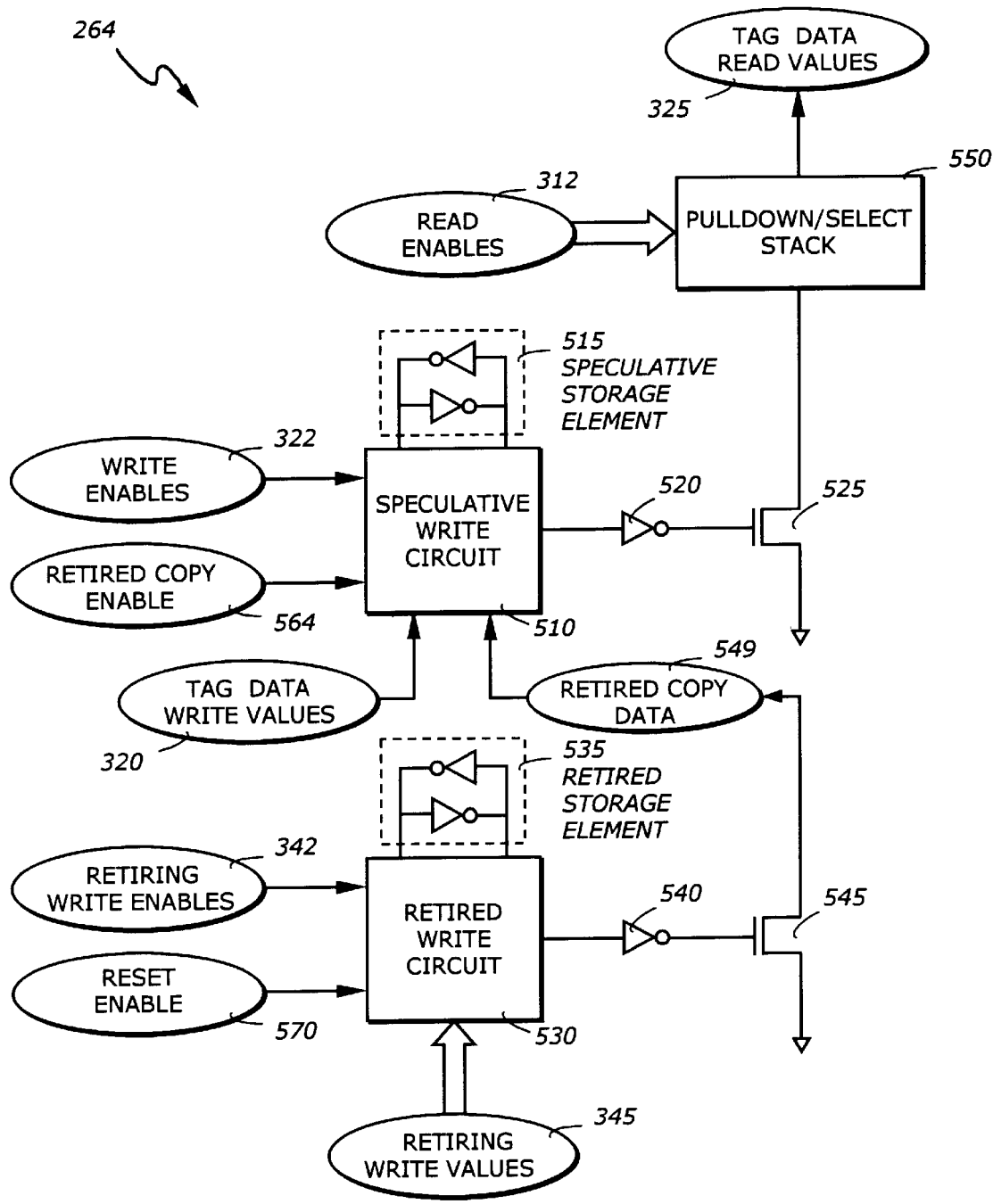
FIG. 5 is a diagram illustrating a write circuit 500 for writing the array tag values according to one embodiment of the invention.

FIG. 5 is a diagram illustrating a write circuit 500 for writing the array tag values. The write circuit 500 includes a speculative write circuit 510, a speculative storage element 515, an inverter 520, a transistor 525, a retired write circuit 530, a retired storage element 535, an inverter 540, a transistor 545, a pulldown/select stack 550, data and signals 312, 320, 322, 325, 342, 549, 564, and 570.

The speculative write circuit 510 receives the write enables 322, the retired copy enable 564, the tag data write values 320, and the retired copy data 549 from the retired write circuit 530. The write enables 322 activate the writing cycle in the write circuit 510. The tag data write values 320 provide the data for the write circuit 510 to write to the speculative array 304. The retired copy enable 564 is the enable signal to start the copying of the retired array 302 to the speculative array 304. The retired copy data 549 comes from the retired array 304 and is the data to be written to the speculative array 304 when there is an exception condition. The speculative storage element 515 stores the written information. As shown in FIG. 5, the storage element 515 is merely a representative of the storage elements in the speculative array 304.

The inverter 520, the transistor 525, and the pulldown/ select stack 550 provide the data path for reading. The read enables 312 select the proper fields for reading from the array. The tag data read values 325 are the tag values as read from the speculative array 304.

The retired write circuit 530 receives the retiring write enables 342, the reset enable 570, and the retiring write data 345. The retiring write enables 342 activate the writing cycle when a uOp is retiring. The retiring write data 345 are the tag values of the retiring uOp to be written into the retired array 530. The reset enable 570 starts the reset sequence when the retired array 302 is initialized upon power on reset or other reset conditions. The retired storage element 535 stores the written information. As shown in FIG. 5, the storage element 535 is merely a representative of the storage elements in the retired array 302.

The inverter 540 and the transistor 545 provide the data path for transferring to the speculative array. The retired copy data 549 represents the tag values as read from the retired array 302.

Figure 6:
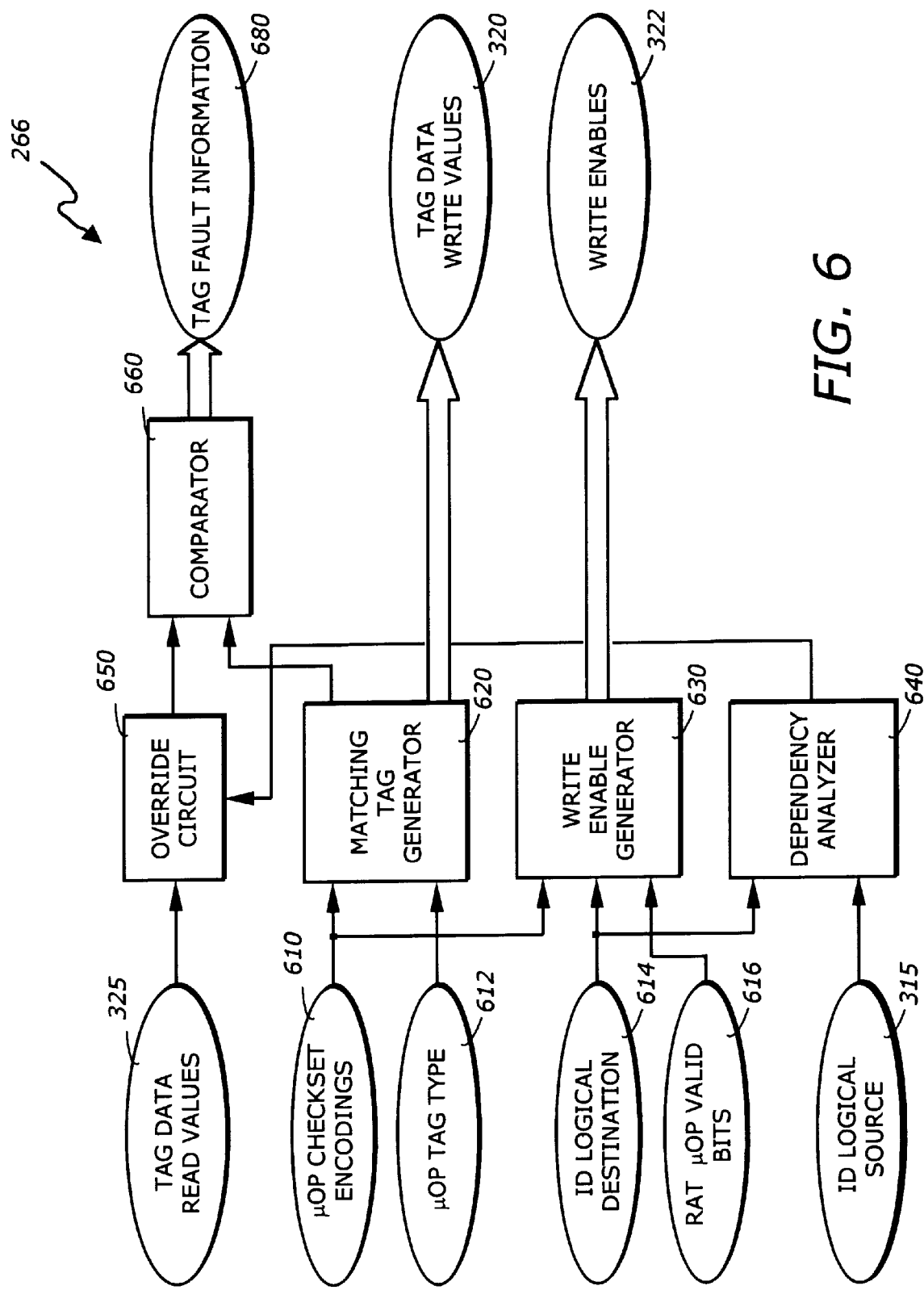
FIG. 6 is a diagram illustrating the match and update circuit 266 according to one embodiment of the invention.

FIG. 6 is a diagram illustrating the match and update circuit 266. The match and update circuit 266 performs all of the source and destination tag checking and sets the appropriate tag values in the tag array. The match and update circuit 266 includes a matching tag generator 620, a write enable generator 630, a dependency analyzer 640, an override circuit 650, and a comparator, and data and signals 315, 320, 3222, 325, 610, 612, 614, 616, and 680.

The match and update circuit 266 reads out tag values from the speculative array 304 for the current set of uOps, compares with the tag requirements mandated by each of the uOps itself. For example, an extended integer uOp requires that both of its sources have extended integer tag values, and that these sources have a 128-bit size as indicated by the size bit. The match and update circuit 266 then checks for concurrent uOp dependencies between the previous destination and later sources, and then flags any faults. The match and update circuit 266 uses the tag values from the speculative array 304, the extended opcode modifiers, and the extended uOp modifiers. The match and update circuit 266 generates a set of tag fault detection bits for each issued uOp. For tag checking between uOp sources and uOp destination type, the ID logical source values index into the speculative array 304 and read out the appropriate source tag and size values. For each uOp, its source tag and size values are compared against the uOp's check set encoding.

The matching tag generator 620 receives the uOp checkset encodings 610 and the uOp tag type 612. From this information, the matching tag generator 620 generates the tag data write values 320 and a type code representing the expected data type and the size of the operand of the uOp. The comparator 660 compares this type code with the tag values as read from the override circuit 650.

The override circuit 650 essentially maintains a copy of the tag data read values of the first uOp. The override circuit 650 receives the dependency information from the dependency analyzer 640. If the information indicates that there is a dependency, the override circuit switches to the copy of the previous tag data read values. If there is no dependency, the override circuit 650 uses the currently read tag values read values 325.

The write enable generator 630 receives the uOp checkset encodings 610, the ID logical destination 614, and the RAT uOp valid bits 616 to generate the appropriate write enables 322.

The dependency analyzer 640 receives the ID logical destination 614 and the ID logical sources 315 and performs a dependency analysis. The dependency analyzer essentially includes storage elements to store the source and destination information of successive uOps and compare these values. If there is dependency condition, the dependency analyzer 640 asserts a signal to the override circuit 650. An example of a dependency condition is when the ID logical destination 614 of a uOp is the same as the ID logical source 315 of a subsequent uOp.

Figure 7:
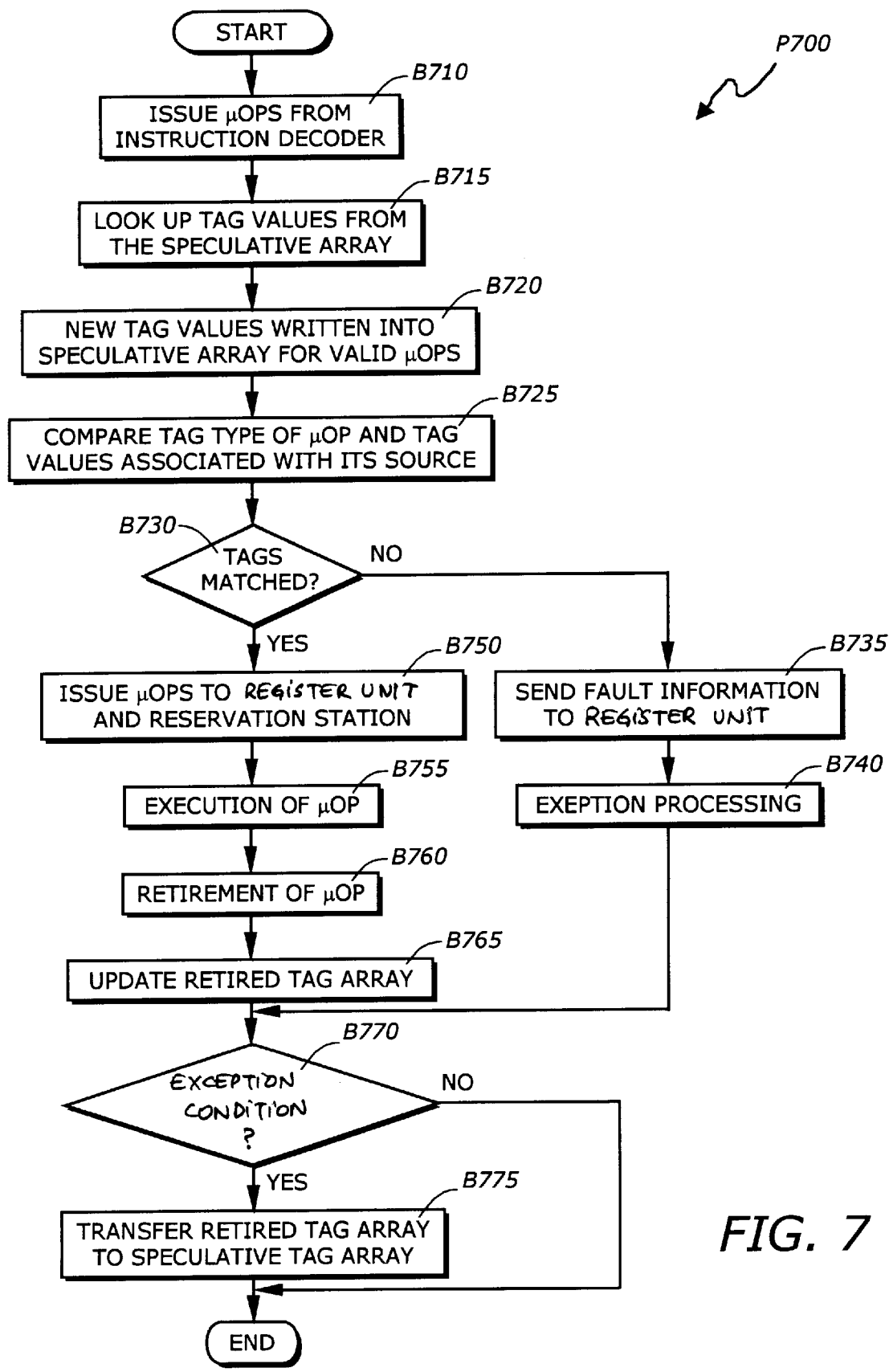
FIG. 7 is a flowchart illustrating a process P700 to perform data type checking using a tagged array architecture according to one embodiment of the invention.

FIG. 7 is a flowchart illustrating a process P700 to perform data type checking using a tagged array architecture.

At START, the process P700 enters block B710. In block B710, the uOps are issued from the instruction decoder. In one embodiment, three uOps are issued at the same time. The process P700 then enters block B715 where each of the 3 uOp's sources are used to index into the speculative array to read out the tag value associated with each architectural register. The process P700 then enters block B720 where the new tag values are written into the speculative array for valid uOps.

The process P700 then enters block B725 to compare the tag type indicated by the uOp itself and the tag values associated with its sources. In block B730, the process P700 determines if the tag values are matched. If NO, the process P700 enters block B735. If YES, the process P700 enters block B750.

In block B735, the process P700 sends the fault information to the register unit. Then the process P700 enters block B740 to begin appropriate exception processing. The process P700 then goes to block B770. In one embodiment, the process P700 terminates after the exception processing.

In block B750, the process P700 issues the uOps whose tag values have been matched to the register unit and the reservation station. The process P700 then enters block B755 to begin execution of the uOps. Then the process P700 enters block B760 to retire the uOps. In one embodiment, the process P700 does not retire the uOps after the execution, but rather before or concurrently with the execution of the uOps. After the uOps are retired, the process P700 enters block B765 to update the retired tag array by writing the tag values of the retired uOps in the retired array.

After the retired tag array is updated in block B765, the process P700 enters block B770 to determine if there is any exception condition. If NO, the process P700 terminates. If YES, the process P700 enters block B775 to transfer the entire retired tag array to the speculative array to maintain the tag values. The process P700 then terminates.

The present invention provides an efficient mechanism to check the data types in uOps through the maintenance of two tag arrays. The present invention therefore avoids the data type mismatch problems frequently found in different implementations of the microprocessor.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a speculative array to store a set of attributes corresponding to a set of architectural registers;
    a read circuit coupled to the speculative array to read an attribute value of a storage element corresponding to an operand of an instruction; and
    a match circuit coupled to the speculative array to compare the attribute value read from the speculative array and a type code of the operand specified by the instruction, the match circuit comprising:
        an override circuit to select the attribute value based on a select signal representing a dependency condition,
        a matching generator to generate the type code,
        a comparator coupled to the matching generator and the override circuit to compare the attribute value and the type code, the comparator generating tag fault information if there is a mismatch between the attribute value and the type code, and
        a dependency generator to generate the select signal.

2. The apparatus of claim 1 further comprises:
    a retired array coupled to the speculative array to store a set of retired attributes, the retired attributes corresponding to the set of registers.

3. The apparatus of claim 2 wherein the retired array is updated when the instruction is retired.

4. The apparatus of claim 2 wherein contents of the retired array are transferred to the speculative array when there is an exception condition.

5. The apparatus of claim 4 wherein the exception condition includes a branch misprediction.

6. The apparatus of claim 1 wherein the attribute value includes a tag field.

7. The apparatus of claim 1 wherein the override circuit stores a copy of the attribute value.

8. The apparatus of claim 1 wherein the matching generator receives an encoding representing an instruction type.

9. The apparatus of claim 1 wherein the dependency generator compares a destination code of a first instruction with a source code of a second instruction, the first and second instructions being logically successive.

10. The apparatus of claim 4 further comprises:
    a speculative write circuit coupled to the speculative array to update the speculative array; and
    a retired write circuit coupled to the retired array to update the retired array when the instruction is retired.

11. A method comprising:
    storing a set of attributes corresponding to a set of architectural registers in a speculative array;
    reading an attribute value of a storage element corresponding to an operand of an instruction; and
    matching the attribute value read from the speculative array and a type code of the operand specified by the instruction, the matching comprising:
        selecting the attribute value based on a select signal representing a dependency condition,
        generating the type code,
        comparing the attribute value with the type code,
        generating tag fault information if there is a mismatch between the attribute value and the type code, and
        generating the select signal.

12. The method of claim 11 further comprises:
    storing a set of retired attributes in a retired array, the retired attributes corresponding to the set of registers.

13. The method of claim 12 further comprising updating the retired array when the instruction is retired.

14. The method of claim 12 further comprising transferring contents of the retired array to the speculative array when there is an exception condition.

15. The method of claim 14 wherein the exception condition includes a branch misprediction.

16. The method of claim 11 wherein the attribute value includes a tag field.

17. The method of claim 11 wherein selecting the attribute value comprises storing a copy of the attribute value.

18. The method of claim 11 wherein generating the type code comprises receiving an encoding representing an instruction type.

19. The method of claim 11 wherein generating the select signal comprises comparing a destination code of a first instruction with a source code of a second instruction, the first and second instructions being logically successive.

20. The method of claim 14 further comprises:
    updating the speculative array by a speculative write circuit; and
    updating the retired array when the instruction is retired by a retired write circuit.

21. A processor comprising:
    an instruction decoder to decode an instruction; and
    a tagged array block coupled to the instruction decoder to perform type checking, the tagged array block comprising:
        a speculative array to store a set of attributes corresponding to a set of architectural registers, a read circuit coupled to the speculative array to read an attribute value of a storage element corresponding to an operand of the instruction, and a match circuit coupled to the speculative array to compare the attribute value read from the speculative array and a type code of the operand specified by the instruction, the match circuit comprising:

an override circuit to select the attribute value based on a select signal representing a dependency condition, a matching generator to generate the type code, a comparator coupled to the matching generator and the override circuit to compare the attribute value and the type code, the comparator generating tag fault information if there is a mismatch between the attribute value and the type code, and a dependency generator to generate the select signal.

22. The processor of claim 21 wherein the tagged array block further comprises:

a retired array coupled to the speculative array to store a set of retired attributes, the retired attributes corresponding to the set of registers.

23. The processor of claim 22 wherein the retired array is updated when the instruction is retired.

24. The processor of claim 22 wherein contents of the retired array are transferred to the speculative array when there is an exception condition.

25. The processor of claim 24 wherein the exception condition includes a branch misprediction.

26. The processor of claim 21 wherein the attribute value includes a tag field.

27. The processor of claim 21 wherein the override circuit stores a copy of the attribute value.

28. The processor of claim 21 wherein the matching generator receives an encoding representing an instruction type.

29. The processor of claim 21 wherein the dependency generator compares a destination code of a first instruction with a source code of a second instruction, the first and second instructions being logically successive.

30. The processor of claim 24 wherein the tagged array block further comprises:

a speculative write circuit coupled to the speculative array to update the speculative array; and a retired write circuit coupled to the retired array to update the retired array when the instruction is retired.

* * * * *